E. KRAUSE.
SINGEING COMB.
APPLICATION FILED JAN. 8, 1909.
961,620.
Patented June 14, 1910.
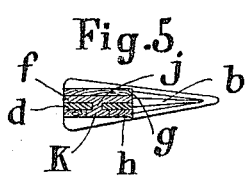
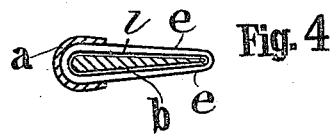
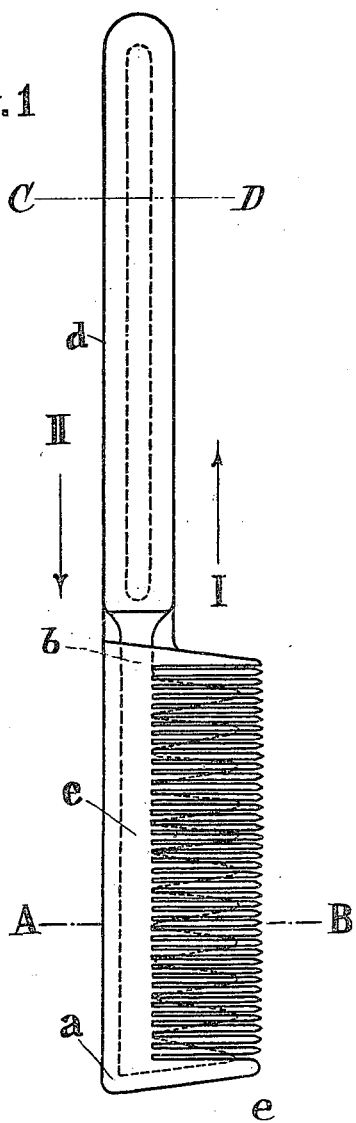
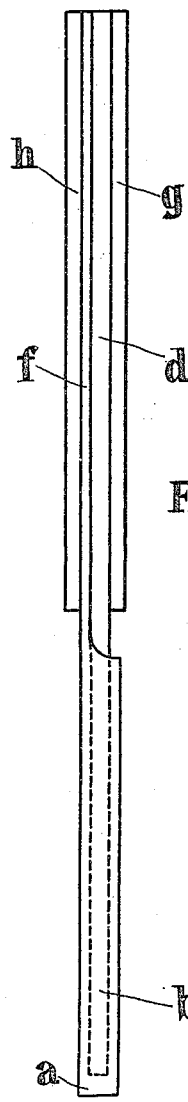
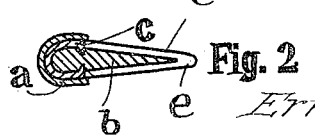
WITNESSES:
C. M. Crawford
E. Schallinger
INVENTOR
Ernst Krause
BY
B. Singer
ATTORNEY

UNITED STATES PATENT OFFICE.

ERNST KRAUSE, OF STEGLITZ, NEAR BERLIN, GERMANY.

SINGEING-COMB.

961,620.  Specification of Letters Patent. Patented June 14, 1910.

Application filed January 8, 1909. Serial No. 471,368.

*To all whom it may concern:*

Be it known that I, ERNST KRAUSE, a subject of the Emperor of Germany, residing at No. 1 Akazienstrasse, Steglitz, near Berlin, in the Empire of Germany, have invented certain new and useful Improvements in Hair-Singeing Combs, of which the following is a specification.

This invention relates to singeing combs, which also may be used in place of ordinary combs.

An object of the invention is to provide a comb which may be handled by the operator without burning the scalp or the skin of the face, even when said comb is heated to a considerable degree.

Another object is to provide a comb which will not communicate its heat to the fingers of the operator.

Another object is to provide a comb, with which it will be possible to impart a wavy appearance to the hair, simply by treating it with said comb.

Other objects will be more fully understood by reference to the following specification in connection with the accompanying drawing and the appended claims.

In the drawing, Figure 1, is a side elevation of an embodiment of this invention. Fig. 2, is a section on line A—B of Fig. 1. Fig. 3, is a rear elevation of the same. Fig. 4, is a sectional view through another embodiment of this invention. Fig. 5, is a sectional view on line C—D of Fig. 1.

By reference to the drawing, it will be noted that a comb, comprising a toothed portion $b$ and a handle $d$ attached thereto, is interposed between two similar combs $e$. The lateral combs on the outside of the member $b$ are united at their back portion by means of a back plate $a$. Figs. 1 and 2 show that the respective points of the toothed portion of the lateral protecting combs $e$ are united, thereby forming a protector in which the comb $b$ is slidably disposed. Between the slidable comb $b$ and the back plate $a$ forming the rear portion of the protector, a heat insulating layer $c$ is interposed. This insulating layer $c$ prevents the back of the comb $b$ from coming into contact with the back plate $a$ of the protecting combs $e$. For the purpose of preventing the points of the teeth of the sliding comb $b$ from coming into contact with the points of the protecting comb $e$ guiding portions are disposed on the handle $d$ of the slidable comb, said portions registering with corresponding portions on the handle of the protecting comb $e$. As indicated in Fig. 5, sliding grooves $j$ are cut in one of the handle plates and projecting portions $k$ attached to the companion plate, enter into said grooves and are guided thereby, holding the singeing comb $b$ in substantially parallel relation with the protecting combs $e$. The handle of the comb proper and of the protecting combs preferably are provided with heat insulating plates $h$ and $g$, as shown in Fig. 3.

It will be seen that through the guidance of the plate the inner comb is kept at a distance from the points of the protecting comb, so that always an air space is created between the points of the companion combs $e$ and those of the singeing comb $b$.

Fig. 4 shows the cross section of a comb, wherein the inner slidable member is separated from the protecting comb by an air gap $l$ on its entire circumference, no insulating layer being interposed between the two members.

In the operation the inner comb $b$ is drawn out of the protecting comb in the direction indicated by arrow I in Fig. 1, and it is then heated over some convenient flame. After being heated to a sufficient degree it is being inserted again into the protecting comb by moving it in the direction indicated by the arrow II. The outer protecting comb $e$ will not get hot enough to burn or hurt the skin of the user, because the two combs are separated by an air gap and because the large surface arising from a large number of teeth presented by the two combs radiates the heat in comparatively short time. When it is desired to impart a wavy appearance to the hair, then the inner comb is slidingly reciprocated within the protecting comb while the user is applying the comb to the hair.

I claim—

1. A device of the class described comprising in combination a comb, a protecting member for said comb, said protecting member embracing combs arranged at both sides of said first named comb, a portion connecting the backs of said protector combs, and a heat insulating layer inserted between the back of said first named comb and said protecting combs, said first named comb being slidably disposed with respect to said protector.

2. A device of the class described comprising in combination a comb, a protecting member for said comb, said protecting member embracing combs arranged at both sides of said first named comb, said protecting combs being separated laterally and at the points of their teeth from said first named comb by an air gap, said first named comb being slidably disposed with respect to said protecting member.

3. A device of the class described comprising in combination a comb, a protecting member for said comb, said protecting member embracing combs arranged at both sides of said first named comb and being separated therefrom by an air gap, a handle attached to said comb, another handle in juxtaposition with said first named handle and attached to said protecting member, heat insulating elements secured to said handles, one of said elements being slidable and provided with a groove, and guiding portions attached to the other handle and projecting into said groove.

In testimony whereof I affix my signature in presence of two witnesses.

ERNST KRAUSE.

Witnesses:
  HENRY HASPER,
  WOLDEMAR HAUPT.